United States Patent
Natsuyama

(10) Patent No.: US 11,003,351 B2
(45) Date of Patent: May 11, 2021

(54) DISPLAY PROCESSING METHOD AND INFORMATION DEVICE

(71) Applicant: GREE, INC., Tokyo (JP)

(72) Inventor: Hiroki Natsuyama, Tokyo (JP)

(73) Assignee: GREE, INC., Tokyo (JP)

( * ) Notice: Subject to any disclaimer, the term of this patent is extended or adjusted under 35 U.S.C. 154(b) by 256 days.

(21) Appl. No.: 14/655,561

(22) PCT Filed: Dec. 4, 2013

(86) PCT No.: PCT/JP2013/082552
§ 371 (c)(1),
(2) Date: Jun. 25, 2015

(87) PCT Pub. No.: WO2014/103634
PCT Pub. Date: Jul. 3, 2014

(65) Prior Publication Data
US 2015/0363103 A1    Dec. 17, 2015

(30) Foreign Application Priority Data

Dec. 26, 2012   (JP) .............................. JP2012-282794

(51) Int. Cl.
*G06F 3/0484*   (2013.01)
*G06F 3/0488*   (2013.01)
*G06T 3/40*     (2006.01)

(52) U.S. Cl.
CPC ........ *G06F 3/04886* (2013.01); *G06F 3/0488* (2013.01); *G06F 3/04842* (2013.01);
(Continued)

(58) Field of Classification Search
CPC ................................................. G06F 3/04847
(Continued)

(56) References Cited

U.S. PATENT DOCUMENTS 8,365,074 B1 *   1/2013   Wagner ............... G06F 3/04855
                                                715/702
9,086,800 B2 *   7/2015   Lim ..................... G06F 3/04883
(Continued)

FOREIGN PATENT DOCUMENTS

JP   2000-267777 A   9/2000
JP   2004 152217 A   5/2004
(Continued)

OTHER PUBLICATIONS

ABF Software, "Magnifying Tools", available at <http://www.abf-soft.com/magnifying-tools/data/abfMagnifyingTools.pdf>, archived on May 30, 2004 at wayback machine <http://web.archived.org>, 20 pages.*

(Continued)

*Primary Examiner* — Daniel Rodriguez
(74) *Attorney, Agent, or Firm* — Maier & Maier, PLLC

(57) ABSTRACT

An information device and display processing method that allow any position in an image to be enlarged or reduced, and the degree of enlargement or reduction to be performed in an intuitive and intelligible manner The information device receives a predetermined touch operation performed on touch panel, retrieves a second image corresponding to a first image displayed on a display unit in accordance with the location of the touch operation, displays the second image within a ring-shaped frame image in accordance with the position of the touch manipulation, receives a subsequent touch operation of the touch panel along the ring-shaped frame image, and changes the second image in accordance with the operational amount and operational direction of the subsequent touch operation.

27 Claims, 8 Drawing Sheets

(52) U.S. Cl.
CPC ...... *G06F 3/04845* (2013.01); *G06F 3/04847* (2013.01); *G06T 3/40* (2013.01); *G06F 2203/04805* (2013.01); *G06F 2203/04806* (2013.01)

(58) Field of Classification Search
USPC .......................................................... 715/773
See application file for complete search history.

(56) References Cited

U.S. PATENT DOCUMENTS

| | | | |
|---|---|---|---|
| 9,262,067 B1* | 2/2016 | Bell | G06F 3/017 |
| 2002/0011990 A1* | 1/2002 | Anwar | G06F 3/04847 |
| | | | 345/173 |
| 2003/0117380 A1 | 6/2003 | Kanzaki | |
| 2007/0198950 A1* | 8/2007 | Dodge | G06F 3/0481 |
| | | | 715/815 |
| 2008/0062202 A1* | 3/2008 | Schulz | G06F 3/0481 |
| | | | 345/665 |
| 2009/0048000 A1* | 2/2009 | Ade-Hall | G06F 3/0488 |
| | | | 455/566 |
| 2009/0182501 A1* | 7/2009 | Fyke | G01S 19/35 |
| | | | 701/431 |
| 2010/0162163 A1* | 6/2010 | Wang | G06F 3/04883 |
| | | | 715/800 |
| 2010/0315438 A1 | 12/2010 | Horodezky et al. | |
| 2011/0019058 A1* | 1/2011 | Sakai | G06F 3/04883 |
| | | | 348/333.01 |
| 2011/0047509 A1* | 2/2011 | Arrasvuori | G09B 29/007 |
| | | | 715/815 |
| 2011/0061009 A1* | 3/2011 | Poisson | H04N 1/00183 |
| | | | 715/764 |
| 2011/0157046 A1 | 6/2011 | Lee et al. | |
| 2011/0246943 A1 | 10/2011 | Fujibayashi | |
| 2011/0289392 A1* | 11/2011 | Naqvi | G06F 3/04883 |
| | | | 715/205 |
| 2012/0044173 A1* | 2/2012 | Homma | G06F 3/0488 |
| | | | 345/173 |
| 2012/0131520 A1* | 5/2012 | Tang | G06K 9/2081 |
| | | | 715/863 |
| 2012/0139844 A1* | 6/2012 | Ramstein | G06F 3/016 |
| | | | 345/173 |
| 2012/0191257 A1* | 7/2012 | Corcoran | H04L 12/2818 |
| | | | 700/278 |
| 2012/0194559 A1* | 8/2012 | Lim | G06F 3/04883 |
| | | | 345/660 |
| 2012/0197857 A1* | 8/2012 | Huang | G06F 3/017 |
| | | | 707/706 |
| 2013/0145312 A1* | 6/2013 | Dove | G06F 3/0488 |
| | | | 715/800 |
| 2013/0239063 A1* | 9/2013 | Ubillos | G06K 9/4652 |
| | | | 715/838 |
| 2013/0241828 A1* | 9/2013 | VanBlon | G06F 3/0416 |
| | | | 345/157 |
| 2014/0053100 A1* | 2/2014 | Zhou | G06F 3/0488 |
| | | | 715/790 |
| 2015/0363103 A1 | 12/2015 | Natsuyama | |

FOREIGN PATENT DOCUMENTS

| | | |
|---|---|---|
| JP | 2008-508600 A | 3/2008 |
| JP | 2009-186899 A | 8/2009 |
| JP | 2010-049629 A | 3/2010 |
| JP | 2011-028345 A | 2/2011 |
| JP | 2012-043266 A | 3/2012 |
| JP | 2012-234569 A | 11/2012 |
| JP | 2012-530291 A | 11/2012 |
| JP | 6072340 B1 | 1/2017 |
| WO | 2006/020304 A2 | 2/2006 |
| WO | 2010/071187 A1 | 6/2010 |

OTHER PUBLICATIONS

Japanese Office Action dated Apr. 19, 2016, in connection with corresponding JP Application No. 2014-554273 (9 pgs, including English translation).
International Preliminary Report on Patentability dated Jun. 30, 2015, including the Written Opinion of the International Searching Authority, in connection with corresponding Application No. PCT/JP2013/082552 (6 pgs.).
International Search Report dated Jan. 7, 2014 from corresponding International Application No. PCT/JP2013/082552; 5 pgs.
Japanese Office Action dated Oct. 10, 2017, in connection with corresponding JP Application No. 2016-250952 (7 pgs, including English translation).
Japanese Office Action dated Dec. 11, 2018, in connection with corresponding JP Application No. 2018-073963 (7 pgs., including machine-generated English translation).
Office Action dated Apr. 23, 2019, in corresponding Japanese Application No. 2018-073963; 10 pages.
Japanese Decision of Refusal dated Oct. 8, 2019, in connection with corresponding JP Application No. 2018-073963 (2 pgs., including machine-generated English translation).
Japanese Decision of Dismissal of Amendment dated Oct. 8, 2019, in connection with corresponding JP Application No. 2018-073963 (4 pgs., including machine-generated English translation).
Notice of Termination of Reconsideration by Examiners before Appeal Proceedings along with Reconsideration Report by Examiner before Appeal dated Mar. 3, 2020, in connection with corresponding Japanese Application No. 2018-073963, 6 pages.
Japanese Office Action dated Dec. 22, 2020, in connection with corresponding JP Application No. 2018-73963 (18 pp., including machine-generated English translation).

* cited by examiner

DISPLAY PROCESSING METHOD AND INFORMATION DEVICE

FIELD

Exemplary Embodiments of the disclosure relate to a display processing method suitable for an information device, such as a smartphone including a touch panel, and also relate to an information device.

BACKGROUND

Recently, portable information terminals, such as smartphones and tablet terminals, each of which includes a touch panel, have spread widely and generally. This type of device includes a multi-touch function that realizes a functional operation called "pinch-out or pinch-in," in which an entire image displayed on a screen is enlarged or reduced by performing a touch operation by widening or narrowing the distance between two fingers on a touch panel.

According to this multi-touch function, it is possible to perform screen enlargement or reduction through an intuitive operation. However, for example, in an environment in which a touch operation is performed with one hand while hanging on to a strap in a train, the device body must be held with the one hand and the touch operation must be performed with that hand, thus making the operation difficult.

Additionally, besides the pinch-out or pinch-in operation mentioned above, a technique has been conceived in which a region in a displayed character string traced with a finger is selected, and an enlarged image of the selected character string is displayed in another window (for example, Patent Document 1).

BACKGROUND ART DOCUMENT

Patent Document

Patent Document 1: Japanese Laid-Open Patent Publication No. 2004-152217

According to the technique described in the aforementioned patent document, a region determined by tracing a string of characters with a single finger is displayed in an enlarged state in another window. However, this patent document neither discloses nor suggests any specifics such as examples application to images other than character strings or how to retrieve specific positional coordinates or how to set an enlargement ratio and a reduction ratio.

SUMMARY

An Exemplary objective of the disclosure provides a display processing method and an information device that allows any position in an image to be enlarged or reduced and the degree of enlargement or reduction to be adjusted in an intuitive and intelligible manner, including their degrees.

In accordance with one Exemplary Embodiment, a display processing method is provided that is adapted to be performed by a device including a display unit that displays an image and a touch panel provided integrally with the display unit. The display processing method includes receiving a predetermined touch operation performed on the touch panel; retrieving a second image corresponding to a first image displayed by the display unit in accordance with a position of the touch operation; displaying the second image within a ring-shaped frame image in accordance with the position of the touch operation; receiving a subsequent touch operation performed on the touch panel along the ring-shaped frame image; and changing the second image in accordance with an operational direction and an operational amount of the subsequent touch operation.

According to Exemplary Embodiments of the disclosure, it is possible to allow any position in an image to be enlarged or reduced and degree of enlargement or reduction to be adjusted in an intuitive and intelligible manner.

DETAILED DESCRIPTION

A smartphone according to one embodiment of the present invention will be hereinafter described with reference to the drawings.

Figure 1:
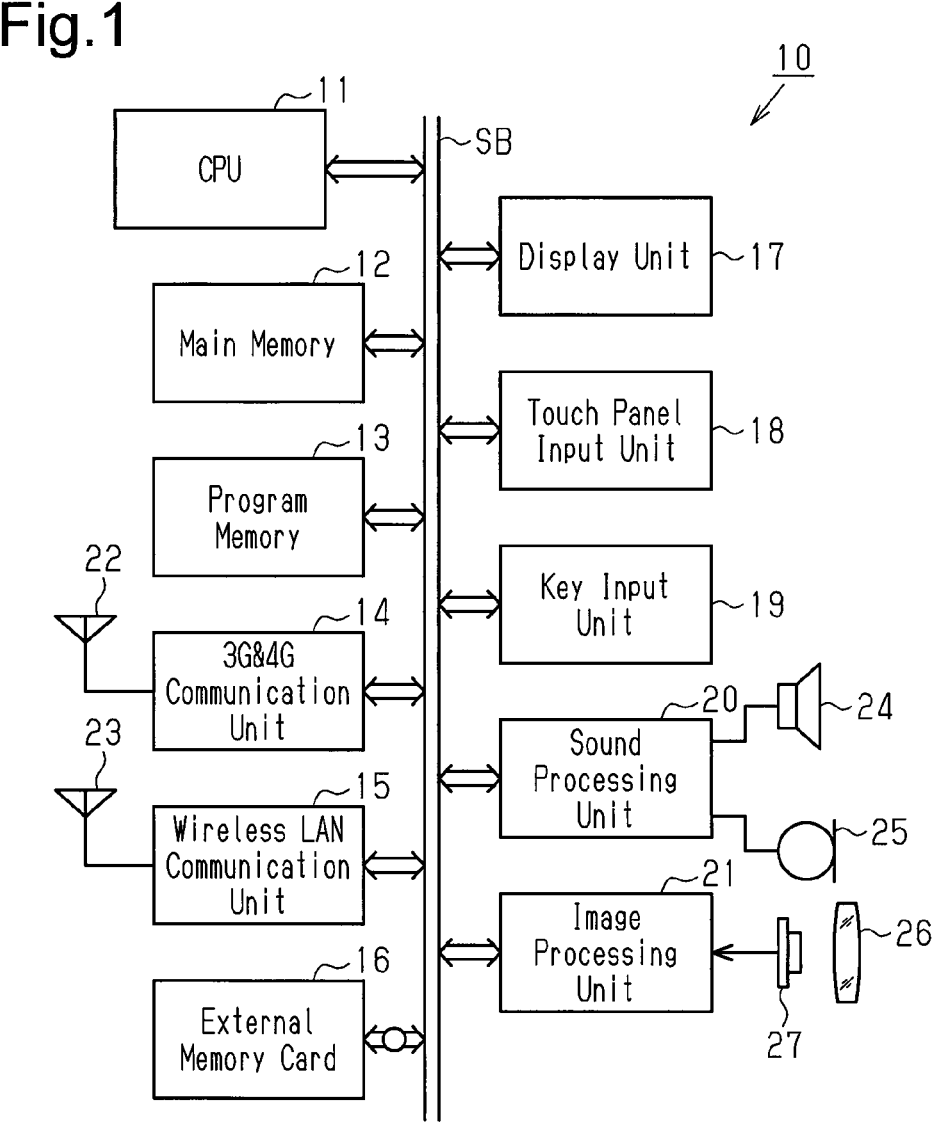
FIG. 1 is an exemplary block diagram showing a functional configuration of an electronic circuit of a smartphone according to one embodiment of the present invention.

FIG. 1 is an exemplary block diagram showing a functional configuration of an electronic circuit of a smartphone 10 according to one embodiment of the present invention. In FIG. 1, a CPU 11 controls operations of the whole of the smartphone 10. The CPU 11 is connected via a system bus SB to a main memory 12, a program memory 13, a 3G&4G communication unit 14 or the like, a wireless LAN communication unit 15, an external memory card 16, a display unit 17, a touch panel input unit 18, a key input unit 19, a sound processing unit 20, and an image processing unit 21.

The CPU 11 can read operational programs (an operating system (OS) and application programs that function on the OS), standardized data, and the like, which are stored in the program memory 13, and load the programs and data into the main memory 12. The CPU 11 then may execute the programs to control operations of the smartphone 10 in a centralized manner.

The main memory 12 may include, for example, an SRAM, and functions as a working memory of the CPU 11. The program memory 13 may include a nonvolatile memory, such as a flash memory, and is used as a storage medium of the smartphone 10 to store various contents, such as image data and music data, in addition to the operational programs and various pieces of standardized data mentioned above.

The 3G&4G communication unit 14 is a dual-mode-operable communication unit that performs data transmission or reception between the 3G&4G communication unit 14 and the, for example, nearest base station (not shown) via an antenna 22 based on a third generation mobile communication system conforming to the IMT-2000 standard and based on a fourth generation mobile communication system conforming to the IMT-Advance standard, or other standards, as described.

The wireless LAN communication unit 15 transmits and receives data to and from the nearest access point (not shown) or the like via an antenna 23 based on, for example, the IEEE802.11a/b/g/n standard.

The display unit 17 may include a TFT color liquid crystal panel provided with a backlight and a drive unit thereof, and displays various images.

The touch panel input unit 18 can be formed integrally with the display unit 17 by use of transparent electrodes, and can generate and output two-dimensional positional coordinate information corresponding to the touch operation by the user.

The key input unit 19 may include some key switches, which are provided in a casing of the smartphone 10 and may include a power source key and a shutter key of the camera function, and a driving circuit that drives those switches.

The sound processing unit 20 can convert digital audio data given via the system bus SB into analog audio data and outputs the analog audio data from the speaker 24. The sound processing unit 20 can also sample and digitize analog audio signals input from the microphone 25 and then output digitized data.

The image processing unit 21 can convert an image signal according to an optical image focused on an image pickup plane of a solid-state image pickup element 27 including, for example, a CCD (Charge Coupled Device) via an optical lens system 26 into digital data, and create and output file data of which the data amount has been compressed according to a predetermined file format, such as joint photographic experts group (JPEG), as one non-limiting example, if it is a still image.

Next, operation of the smartphone 10 in one embodiment will be described. The operation described below may be performed after completing a process in which the CPU 11 reads an operational program and the like that have been stored in the program memory 13 and loads the program into the main memory 12. The operational program stored in the program memory 13 is not limited to the one stored in the program memory 13 when the smartphone 10 is shipped from the factory, but includes a case in which the user of the smartphone 10 may install a higher-grade operational program, which is input from the outside via the antenna 22 and the 3G&4G communication unit 14 or via the antenna 23 and the wireless LAN communication unit 15, as a version-upgraded one.

Figure 2:
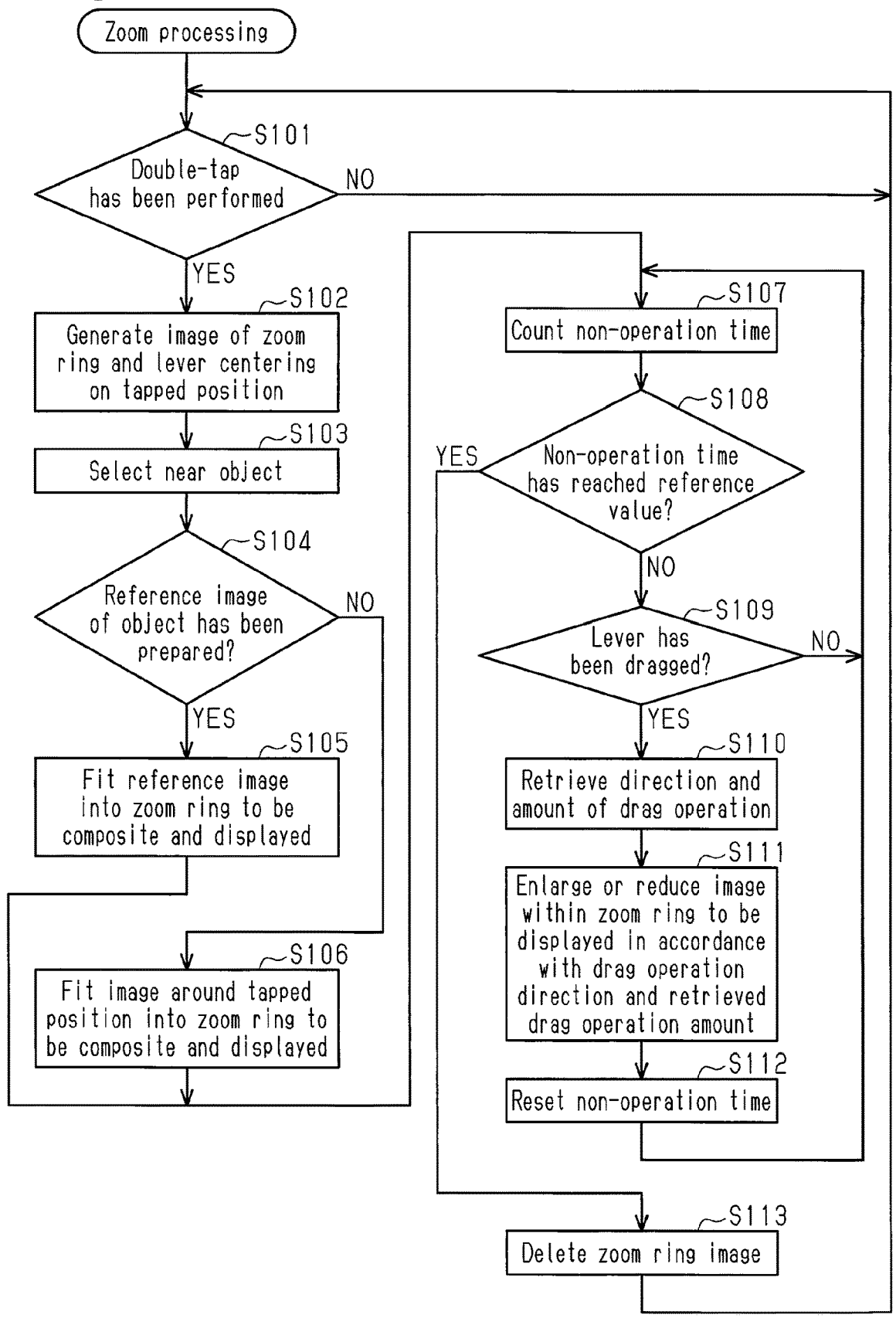
FIG. 2 is an exemplary flowchart showing the processing content of a basic image zooming operation according to the embodiment.

FIG. 2 is an exemplary diagram showing the processing content of a basic image zooming operation that is performed on an image displayed by the display unit 17 when an application program is executed. At the beginning, the CPU 11 repeatedly determines whether an operation called double-tap has been performed based on whether substantially the same coordinate positions consecutively have undergone a touch operation two times within a predetermined period of time, such as about 0.5 seconds, by input from the touch panel input unit 18. As a result, the CPU 11 stands ready for the execution of this operation (step S101). The predetermined period of time may be arbitrarily variable by allowing the user to perform customizing.

When the double-tap operation is actually performed, the CPU 11 can determine that this operation has been performed by input from the touch panel input unit 18 (Yes at step S101), and then an image having a zoom ring (ring-shaped frame image) and a zoom lever (operating lever) that center on a tapped position is generated (step S102). The image of these zoom ring and zoom lever is beforehand stored in the program memory 13 as standardized data.

Thereafter, the CPU 11 selects the near object image from the tapped position from among images displayed by the display unit 17 when a tap operation is performed (step S103). According to the application program being executed, the object image is selected from among some reference images that are hierarchically set while being associated with positional coordinates of the images displayed by the display unit 17. If the application program does not set the reference images in association with positional coordinates, the CPU 11 may not select an object image.

The CPU 11 can determine whether the reference image that is used as an object image has been set by the application program based on whether the object image has been able to be selected (step S104).

If the reference image that is used as an object image has been set by the application program and if the near reference image has been able to be selected in step S103, the CPU 11 can generate a composite image in which the selected object image is fitted in a circular region within the zoom ring, and then display the composite image to be superimposed on an image that centers on the tapped position on the display unit 17 (step S105).

If the reference image that is used as an object image has not been set by the application program in step S104 and if the near reference image has not been able to be selected in step S103, the CPU 11 can generate a composite image in which an image around the tapped position is directly fitted in a circular region at the center of the image of the zoom ring, and then display the composite to be superimposed on an image that centers on the tapped position on the display unit 17 (step S106).

Figure 3A:
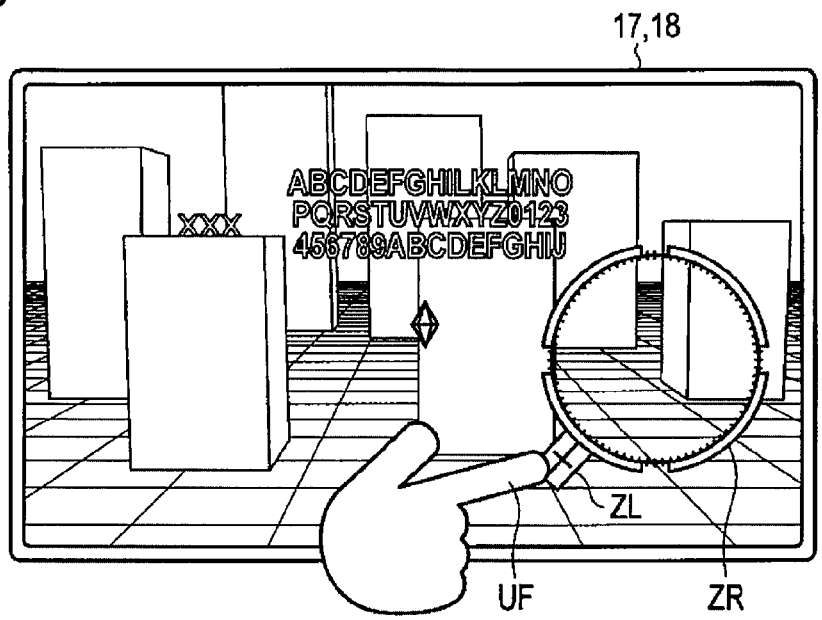
FIG. 3A is an exemplary diagram showing an image display state that uses a zoom ring and a zoom lever according to the embodiment.

FIG. 3A is an exemplary diagram illustrating a state in which an image of the zoom ring ZR and the zoom lever ZL is displayed in accordance with a double-tap operation while the application program is being executed without setting a reference image. In the state of FIG. 3A, the zoom lever ZL is displayed at one place of the outer periphery of the zoom ring ZR the whole of which is graduated, and, for example, is displayed to protrude from the lower-left side.

When the zoom ring ZR and the zoom lever ZL are displayed on the display unit 17 according to the processing of step S105 or of step S106, the CPU 11 can count a period of time (non-operation time) during which no operation is performed on the zoom ring ZR and the zoom lever ZL (step S107). The CPU 11 can determine whether the count value has exceeded a predetermined reference value, e.g., whether a count value showing 2 seconds has elapsed when it is converted into time (step S108). The reference value that determines the non-operation time can be arbitrarily changed by allowing the user to perform customizing.

If it is determined that the count value has not reached the reference value (No at step S108), the CPU 11 can determine whether a drag operation (subsequent touch operation) of the zoom lever ZL along a circular arc of the zoom ring ZR has been performed (step S109).

If it is determined that no drag operation has been performed (No at step S109), the CPU 11 can return to the process starting from step S107 again.

The operations of steps S107 to S109 may be repeatedly performed in this way. As a result, the CPU 11 can await the arrival of the value of the counter that counts the non-operation time at the reference value or awaits the drag operation of the zoom lever ZL.

If it is determined that the zoom lever ZL has been dragged (Yes at step S109), the CPU 11 can retrieve the direction and the amount of a series of drag operations(step S110).

Thereafter, in accordance with the direction and the amount of drag operations retrieved, the CPU 11 may at least change the image within the zoom lever ZL, e.g., the CPU 11 enlarges or reduces the image within the zoom lever ZL (step S111). The CPU 11 can reset the count value of the non-operation time counted above (step S112), and then return to the process starting from step S107 again.

Figure 3B:
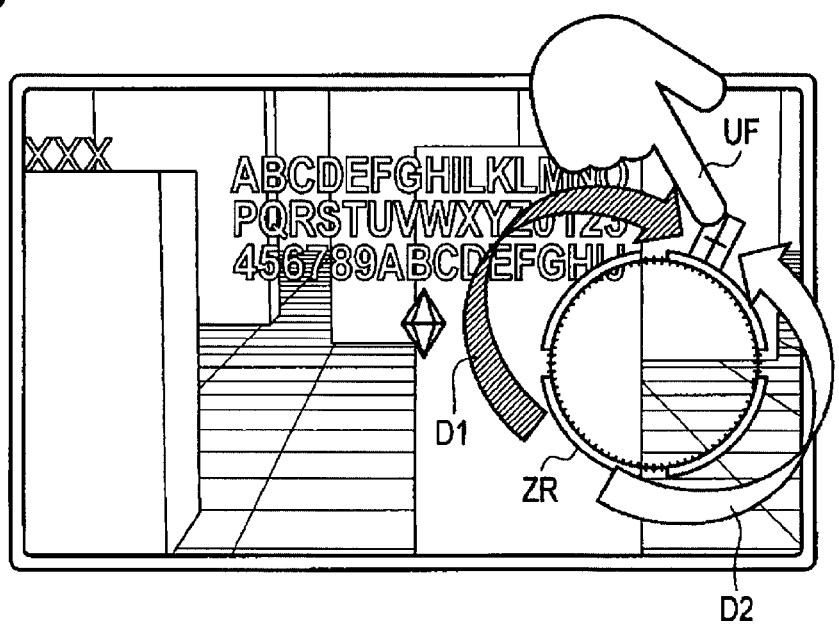
FIG. 3B is an exemplary diagram showing an image display state that uses the zoom ring and the zoom lever according to the embodiment.

FIG. 3B illustrates an exemplary embodiment case in which the user of the smartphone 10 drags the zoom lever ZL with one finger UF in the rightward rotational direction (clockwise) along the circular arc of the zoom ring ZR from the state shown in FIG. 3A.

Suppose that the application program enlarges the image, for example, when the zoom lever ZL is dragged in the rightward rotational direction (clockwise) as shown by arrow D1, and, on the other hand, reduces the image when the zoom lever ZL is dragged in the leftward rotational direction (counterclockwise) as shown by arrow D2. The range of the image to be enlarged and reduced will be described as covering the entire screen of the display unit 17 without being limited to the image appearing in the zoom ring ZR.

In FIG. 3B, the zoom lever ZL is dragged in the rightward rotational direction (clockwise) along the circular arc of the zoom ring ZR from the state shown in FIG. 3A. As a result, the entire image of the display unit 17, including the inside of the zoom ring ZR, is displayed to be enlarged. The enlargement ratio corresponds to the amount of dragging.

In other words, it is possible for the user to stop the drag operation and to separate the finger UF from the touch panel input unit 18 when the image to be enlarged (or reduced) reaches a desired size during the drag operation of the zoom lever ZL.

Alternatively, when the image becomes a too large image exceeding the desired size, the user can reverse the dragging direction at that time, and perform a dragging operation to slightly return it in the opposite direction. Therefore, the image is reduced. As a result, it is possible to retrieve an image having the desired size.

While the zoom ring ZR and the zoom lever ZL are being displayed, the drag operation is effective, and it is possible to enlarge and reduce an image displayed thereon any number of times.

When the value of the counter reaches the reference value without a drag operation (Yes at step S108), the CPU 11 may delete the image of the zoom ring ZR and of the zoom lever ZL, and return to the process starting from step S101 in a state in which the image is displayed at an enlargement or reduction ratio set at that time.

As described in FIG. 3B, not only the image appearing in the zoom ring ZR but also the entire screen displayed on the display unit 17 is enlarged or reduced by operating the zoom lever ZL. However, the present exemplary embodiment is not limited to this, and only the image appearing in the zoom ring ZR may be enlarged or reduced in accordance with an application program to be used.

Additionally, as described in FIGS. 3A and 3B, some reference images are not hierarchically set as object images while being associated with images displayed by the display unit 17. However, it is possible to realize various expressive operations using the zoom ring ZR and the zoom lever ZL by setting various object images according to an application program and by setting functions other than enlargement or reduction in response to a drag operation.

FIGS. 4A, 4B, 5A, 5B, and 6 show setting examples of exemplary object images in various application programs.

Figure 4A:
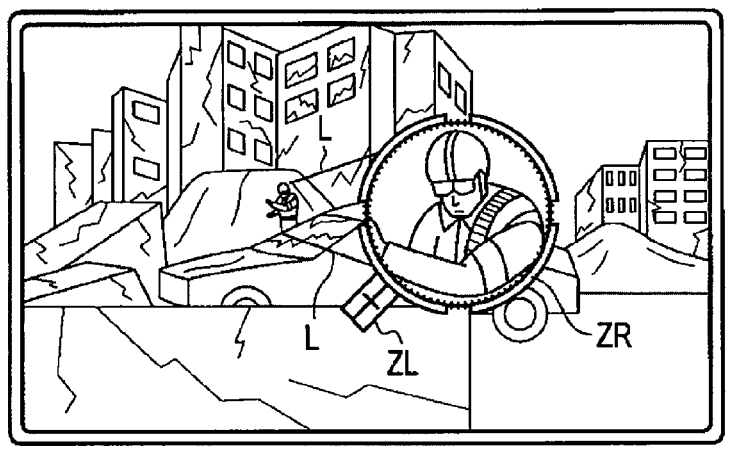
FIG. 4A is an exemplary diagram showing a setting example of an object image in various application programs according to the embodiment.

FIG. 4A illustrates an exemplary state in which an enemy character has been captured, for example, by a scope (of a sniper gun) in a shooting game. In this case, a position within an image at which an enemy seems to exist is double-tapped. As a result, an image of the near enemy character is displayed in the scope, and the original position in the image of the enemy character is displayed by a pair of leads L and L.

When this game program has, for example, an automatic sighting function, the enlargement ratio may be arbitrarily changed by operating the zoom lever ZL, and then a shooting point may be specified within a period of time within which a shot is not fired from the enemy under the condition that the enemy character has already been locked-on. As a result, an arbitrary position of the enemy character may be shot.

Figure 4B:
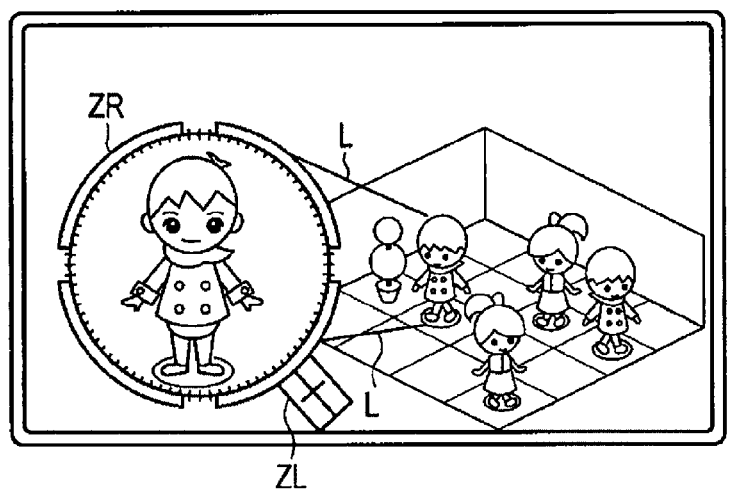
FIG. 4B is an exemplary diagram showing a setting example of an object image in various application programs according to the embodiment.

FIG. 4B shows an exemplary image of a plurality of avatar characters in which the near avatar is displayed within the zoom ring ZR by double-tapping a position in the image and in which the original position in the image of the avatar is displayed by a pair of leads L and L.

When the function of, for example, rotation is set for this avatar image, the avatar displayed in the zoom ring ZR may be rotated in an arbitrary direction by operating the zoom lever ZL.

Figure 5A:
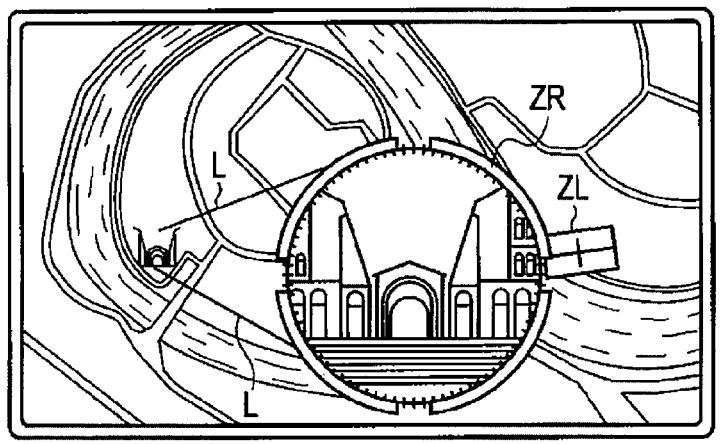
FIG. 5A is an exemplary diagram showing a setting example of an object image in various application programs according to the embodiment.

FIG. 5A illustrates an exemplary state in which a building is specified from some sightseeing points in a map and is displayed. In this case, the near building in a double-tapped position in the image is specified, and the original position of the building is displayed by a pair of leads L and L.

When this application program has the function of, for example, building introduction, images that successively move from the outside to the inside may be displayed by operating the zoom lever ZL as if sightseeing persons move to the inside of a building.

Figure 5B:
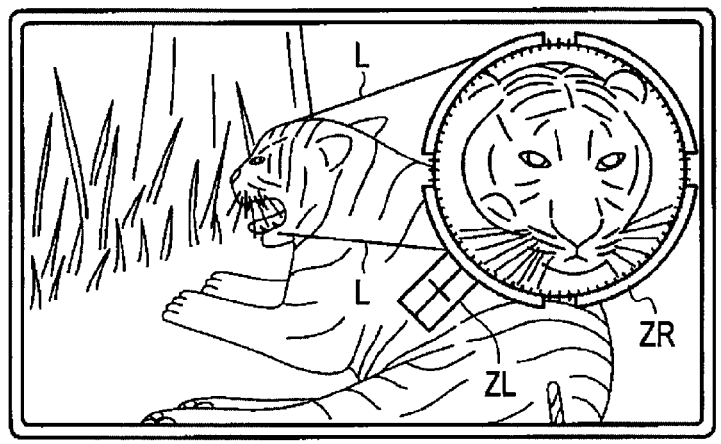
FIG. 5B is an exemplary diagram showing a setting example of an object image in various application programs according to the embodiment.

FIG. 5B shows an exemplary image of a tiger in an animal-featuring game in which the front face of the tiger is displayed in the zoom ring ZR by double-tapping a position in the image, and the original position of the face is displayed by a pair of leads L and L.

When the function of, for example, enlargement or reduction is set for this tiger image, the image of the tiger displayed in the zoom ring ZR may be enlarged or reduced by operating the zoom lever ZL.

Figure 6:
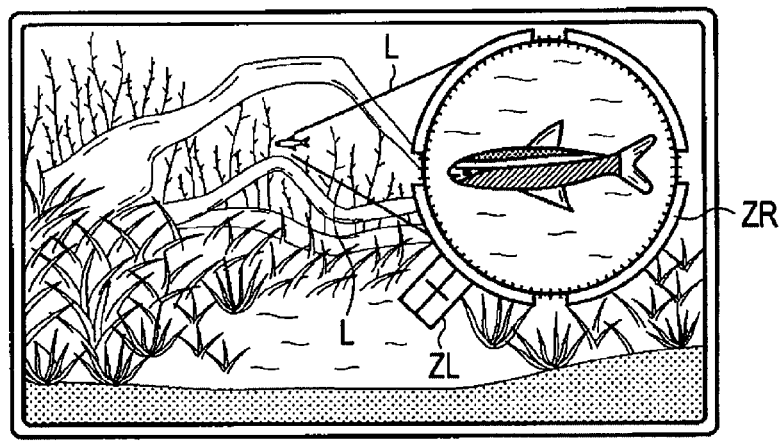
FIG. 6 is an exemplary diagram showing a setting example of an object image in various application programs according to the embodiment.

FIG. 6 illustrates an exemplary state in which tropical fish are individually specified in an aquarium-featuring game and are displayed. In this case, the near tropical fish, such as a cardinal tetra, in a double-tapped position in the image is specified, and the original position in its water tank is displayed by a pair of leads L and L.

When the function of, for example, rotation is set for this tropical fish image, the tropical fish displayed in the zoom ring ZR may be rotated in an arbitrary direction by operating the zoom lever ZL.

Additionally, the zoom ring ZR and the zoom lever ZL according to the embodiment, may be used for an operation to set the function of the smartphone 10 without being limited to the operation for the character images appearing in the application program.

Figure 7A:
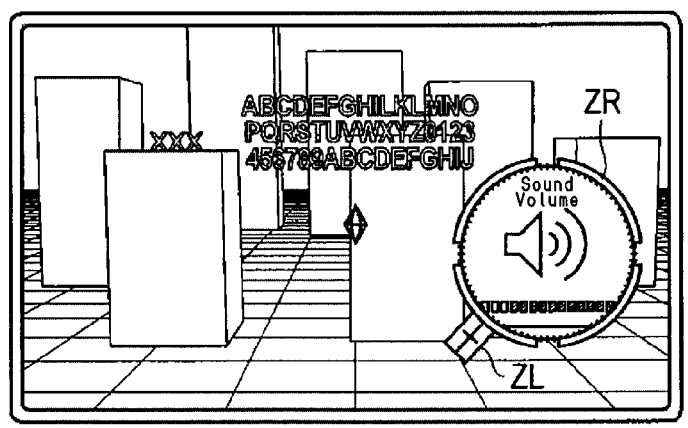
FIG. 7A is an exemplary diagram showing an image example when various functions are set according to the embodiment.
Figure 7B:
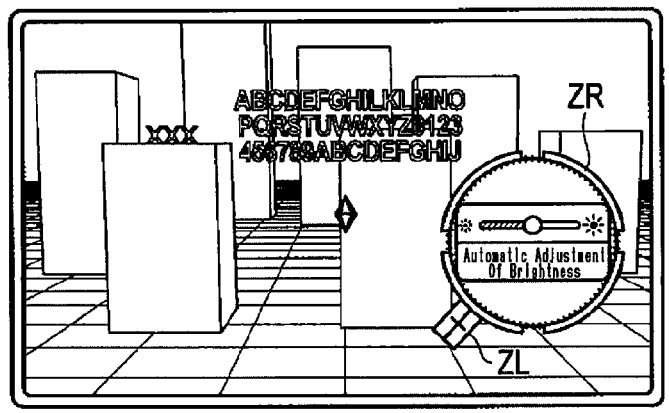
FIG. 7B is an exemplary diagram showing an image example when various functions are set according to the embodiment.
Figure 8:
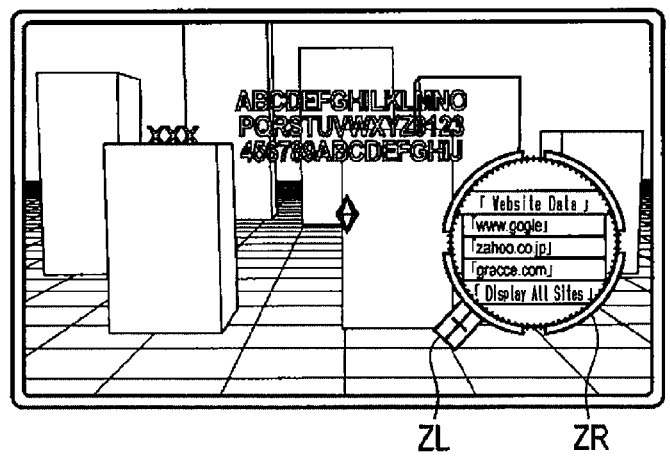
FIG. 8 is an exemplary diagram showing an image example when various functions are set according to the embodiment.

FIGS. 7A, 7B, and 8 are exemplary diagrams, each of which shows an image example when the function of the smartphone 10 is set by using the zoom ring ZR and the zoom lever ZL.

FIG. 7A illustrates an exemplary screen when the sound volume that is output from the speaker 24 is set. In this case, the sound volume can be adjusted up and down by operating the zoom lever ZL.

FIG. 7B illustrates an exemplary image displayed by the display unit 17 and a screen when the brightness of a backlight of the display unit 17 is set. In this case, the degree of the automatic adjustment of brightness can be adjusted up and down by operating the zoom lever ZL.

FIG. 8 illustrates an exemplary screen when a website registered by a bookmark function is selected. In this case, the website can be selected by operating the zoom lever ZL from among a plurality of candidates.

As described in the above exemplary embodiments, a series of process steps may be started by specifying a position in an image by performing a double-tap operation at the beginning of operations. However, the exemplary embodiments of present invention are not limited to this, and is applicable to another mode if it is an operation that can specify the position in the image, such as a long-tap operation in which one tap operation is performed longer than a reference period of time.

As described in detail above, according to the present exemplary embodiments, it is possible to freely perform an operation, such as the enlargement or reduction of an arbitrary position in an image including the degree of enlargement or reduction, in an intuitive and intelligible manner.

Additionally, in the exemplary embodiment, the zoom lever ZL protruding from the zoom ring ZR is operated without dragging the zoom ring ZR. Therefore it is possible to perform a reliable operation without performing a useless zoom operation or the like as a result of a careless touch on the zoom ring ZR.

Additionally, as described in the above exemplary embodiment, a corresponding part of the inside of an image displayed on the display unit 17 is retrieved at that time by the position of the touch operation, and then an operation is performed. Therefore, it is possible to perform an intuitive operation on an image displayed thereon in an extremely intelligible manner.

Additionally, as described in the above exemplary embodiment, under the condition that other reference images are hierarchically associated with an image, the near image is read and displayed from among those reference images in accordance with the position at which a touch operation has been performed. Therefore, an image that is not displayed until then and is related to an image displayed at the beginning is displayed in association therewith. As a result, it is possible to make more diverse, rich expressions.

Additionally, as described in the above embodiment with reference to FIGS. 7A, 7B, and 8, not only the image on the application program but also an image that sets the operating conditions of the device can be displayed according to the same operation system. Therefore it is possible to reduce a burden imposed on the user by unifying operational experiences.

Figure 9:
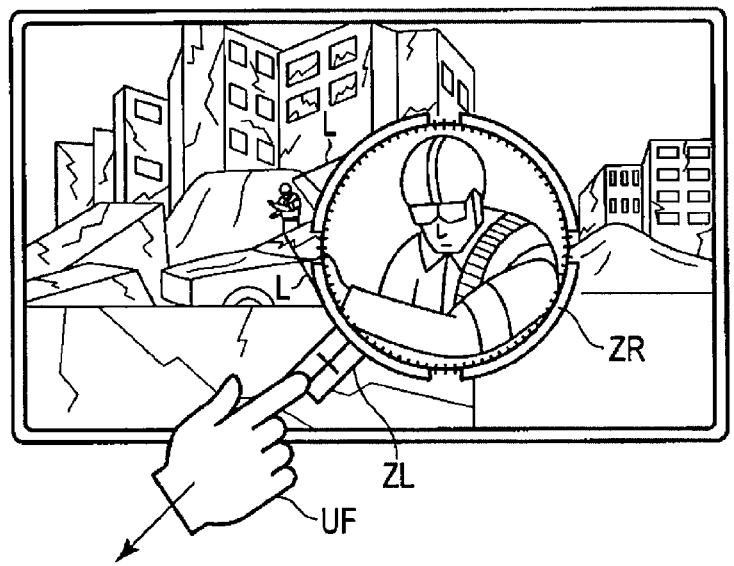
FIG. 9 is an exemplary diagram showing an image example when various functions are set according to the embodiment.

It is also conceivable that the magnitude in the radial direction of the zoom ring ZR displayed within the display unit 17 shown in FIG. 4A is designed to be variable, which has not been described in the embodiment, by dragging the zoom lever ZL (or the zoom ring ZR) in the radial direction perpendicular to the circular arc of the zoom ring ZR as shown in FIG. 9. The display range in the zoom ring ZR can become arbitrarily and easily variable during a series of operation steps by the realization of this operation system. Therefore it is possible to further improve the operability using the zoom ring ZR.

Figure 10:
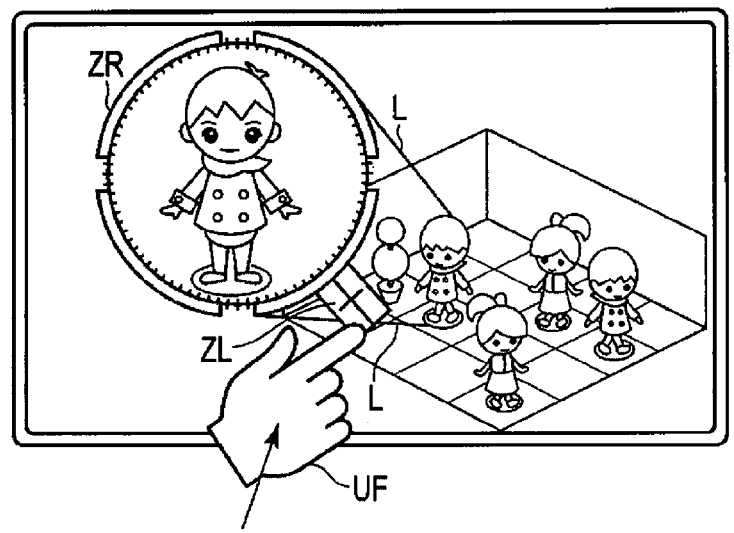
FIG. 10 is an exemplary diagram showing an image example when various functions are set according to the embodiment.

Likewise, it is also conceivable that the zoom lever ZL (or the zoom ring ZR) may be dragged in one or more directions other than the direction along the circular arc of the zoom ring ZR as shown in FIG. 10, and, as a result, the zoom ring ZR is temporarily displayed within the display unit 17 as shown in FIG. 4B, and then the position of the zoom ring ZR in the screen is allowed to be movable in up, down, right, and left directions, which has not been described in the embodiment. The display position in the zoom ring ZR can become arbitrarily and easily variable during a series of operation steps by the realization of this operation system. Therefore it is possible to further improve the operability using the zoom ring ZR.

As described in the above, the exemplary embodiments are applied to the smartphone 10. However, the embodiments are not limited to this, and may be applicable to any device if the device is any one of various portable information terminals provided with a touch panel, such as a mobile type personal computer or a tablet terminal or any other device known to one having skill in the art.

Figure 11:
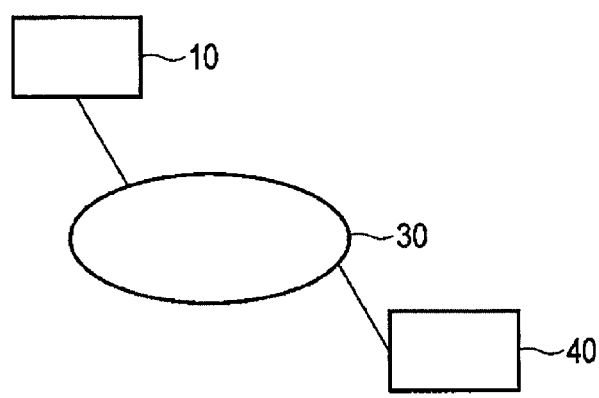
FIG. 11 is an exemplary diagram showing a system configuration according to the embodiment.

As described above, the smartphone 10 performs display processing alone. However, a computer 40 (e.g., a web server) connected to the smartphone 10 via a network 30, such as the Internet, may perform display processing in cooperation with an information device, such as the smartphone 10 as shown in FIG. 11. In more detail, the computer 40 performs the same process as that in the exemplary flowchart of FIG. 2, and then receives positional coordinate information about a touch operation that is output by the touch panel input unit 18 of the smartphone 10 via the network 30, and generates an image to be displayed on the display unit 17 of the smartphone 10 in accordance with this positional coordinate information, and transmits this image to the smartphone 10. As a result, it is possible for the smartphone 10 to display an image according to a user operation as described above.

Besides, Embodiments are not limited to the aforementioned embodiments, and may be variously modified within the range not departing from its gist in the performing stage. Additionally, the functions performed in the aforementioned embodiments may be combined with each other as appropriately as possible. Various steps are included in the aforementioned embodiments, and it is possible to derive various inventions by a combination of constituent elements disclosed. For example, if an effect can be retrieved even if some are deleted from all constituent elements shown in the embodiment, it is possible to derive a configuration, from which the constituent elements have been deleted, as an invention.

The invention claimed is:

1. A display processing method comprising:
controlling a display to display an image;
receiving a first touch operation at a single position on a touch panel provided integrally with the display, the first touch operation including a touch to the single position instead of a multi-touch at multiple positions;
retrieving a first object image that is a control element and corresponds to the position of the first touch operation in the image displayed on the display;
controlling the display to display a ring-shaped frame image that centers on the position of the first touch operation, the ring-shaped frame image encircling a portion of the image;
controlling the display to display the first object image within the ring-shaped frame image;
receiving a second touch operation at a second single position along the ring-shaped frame image, the second touch operation including a touch to the second single position instead of a second multi-touch at multiple positions; and
changing a system setting that corresponds to the control element in accordance with an operational direction and an operational amount of the second touch operation, wherein
the system setting is one of a sound volume or display brightness.

2. The display processing method according to claim 1, further comprising:
controlling the display to display an image of an operating lever at a position corresponding to the position of the first touch operation and external to the ring-shaped frame image; and
controlling the display to display the first object image within the ring-shaped frame image such that the first object image is rotated in a rotational direction corresponding to an operational direction of the operating lever in the second touch operation.

3. The display processing method according to claim 2, further comprising:
storing a plurality of object images in association with a position within the first image; and
selecting any of the object images in accordance with the position of the first touch operation.

4. The display processing method according to claim 2, further comprising:
receiving a third touch operation not along the ring-shaped frame image performed on the ring-shaped frame image or on the operating lever; and
changing a display position of the ring-shaped frame image in accordance with an operational direction and an operational amount of the third touch operation.

5. The display processing method according to claim 1, further comprising:
storing a plurality of object images in association with a position within the first image; and
selecting any of the object images in accordance with the position of the first touch operation.

6. The display processing method according to claim 1, further comprising:
relating the first object image to one or more settings of operating conditions of a device including the display; and
displaying the first object image in which a setting state of the operating conditions of the device has been changed in accordance with the operational direction and the operational amount of the second touch operation.

7. The display processing method according to claim 1, wherein the first object image corresponds to a nearest object, in a set of one or more objects, to the position of the first touch operation.

8. The display processing method according to claim 1, wherein the image includes two or more object images.

9. The display processing method according to claim 1, further comprising:
controlling the display to display a lead to the position of the first touch operation from the ring-shaped frame image.

10. The display processing method according to claim 1, wherein changing the display of the first object image comprises adjusting a size of the first object image.

11. The display processing method according to claim 10, further comprising:
changing the display of the first object image in accordance with the operational direction and the operational amount of the second touch operation.

12. An information device comprising:
a display unit that displays an image;
a touch panel provided integrally with the display unit;
a first operation receiving unit that receives a first touch operation at a single position on the touch panel, the first touch operation including a touch to the single position instead of a multi-touch at multiple positions;
a retrieving unit that retrieves a first object image that is a control element and corresponds to the position of the first touch operation in the image displayed on the display unit;
a first display control unit that displays a ring-shaped frame image that centers on the position of the first touch operation, the ring-shaped frame image encircling a portion of the image, and displays the first object image within the ring-shaped frame image;
a second operation receiving unit that receives a second touch operation at a second single position along the ring-shaped frame image, the second touch operation including a touch to the second single position instead of a second multi-touch at multiple positions; and
a second display control unit that changes a system setting that corresponds to the control element in accordance with an operational direction and an operational amount of the second touch operation, wherein
the system setting is one of a sound volume or display brightness.

13. The information device according to claim 12, wherein
the first display control unit further displays an image of an operating lever at a position corresponding to the position of the first touch operation and external to the ring-shaped frame image; and
the first display control unit further displays the first object image within the ring-shaped frame image such that the first object image is rotated in a rotational direction corresponding to an operational direction of the operating lever in the second touch operation.

14. The information device according to claim 13, further comprising:

a third operation receiving unit that receives a third touch operation in a radial direction of the ring-shaped frame image performed on the ring-shaped frame image or on the operating lever;

wherein the second display control unit further changes a size of the ring-shaped frame image in accordance with an operational direction and an operational amount of the third touch operation.

15. The information device according to claim 13, further comprising:
a fourth operation receiving unit receiving a third touch operation not along the ring-shaped frame image performed on the ring-shaped frame image or on the operating lever;
wherein the second display control unit further changes a display position of the ring-shaped frame image in accordance with an operational direction and an operational amount of the third touch operation.

16. The information device according to claim 12, further comprising:
a memory that stores a plurality of object images in association with a position within the first image;
wherein the retrieving unit further selects any of the object images in accordance with the position of the first touch operation.

17. The information device according to claim 12, comprising:
a memory that relates the first object image to one or more settings of operating conditions of a device;
wherein the second display control unit displays the first object image in which a setting state of the operating conditions of the device has been changed in accordance with the operational direction and the operational amount of the second touch operation.

18. The information device according to claim 12, wherein the second display control unit is configured to change the display of the first object image by adjusting a size of the first object image.

19. The information device according to claim 12, wherein
the second display control unit changes the display of the first object image in accordance with the operational direction and the operational amount of the second touch operation.

20. A display processing method adapted to be performed by a computer, the display processing method comprising:
causing a display unit to display an image;
receiving a first touch operation at a single position on the touch panel provided integrally with the display unit, the first touch operation including a touch to the single position instead of a multi-touch at multiple positions;
retrieving a first object image that is a control element and corresponds to the position of the first touch operation in the image displayed on the display unit;
causing the display unit to display a ring-shaped frame image that centers on the position of the first touch operation, the ring-shaped frame image encircling a portion of the image;
causing the display unit to display the first object image within the ring-shaped frame image in the display unit;
receiving a second touch operation at a second single position along the ring-shaped frame image, the second touch operation including a touch to the second single position instead of a second multi-touch at multiple positions; and
changing a system setting that corresponds to the control element in accordance with an operational direction and an operational amount of the second touch operation, wherein
the system setting is one of a sound volume or display brightness.

21. The display processing method according to claim 20, further comprising:
causing the display unit to display an image of an operating lever at a position corresponding to the position of the first touch operation and external to the ring-shaped frame image; and
causing the display unit to display the first object image within the ring-shaped frame image such that the first object image is rotated in a rotational direction corresponding to an operational direction of the operating lever in the second touch operation.

22. The display processing method according to claim 21, further comprising:
receiving a third touch operation in a radial direction of the ring-shaped frame image performed on the ring-shaped frame image or on the operating lever; and
changing a size of the ring-shaped frame image in accordance with an operational direction and an operational amount of the third touch operation.

23. The display processing method according to claim 21, further comprising:
receiving a third touch operation not along the ring-shaped frame image performed on the ring-shaped frame image or on the operating lever; and
changing a display position of the ring-shaped frame image in accordance with an operational direction and an operational amount of the third touch operation.

24. The display processing method according to claim 20, further comprising:
storing a plurality of object images in association with a position within the first image; and
selecting any of the object images in accordance with the position of the first touch operation.

25. The display processing method according to claim 20, further comprising:
relating the first object image to one or more settings of operating conditions of the computer; and
displaying the first object image in which a setting state of the operating conditions of the device has been changed in accordance with the operational direction and the operational amount of the second touch operation.

26. The display processing method according to claim 20, wherein changing the display of the first object image comprises adjusting a size of the first object image.

27. The display processing method according to claim 20, further comprising:
changing the display of the first object image in accordance with the operational direction and the operational amount of the second touch operation.

* * * * *